United States Patent
McFarland

(10) Patent No.: US 7,131,207 B2
(45) Date of Patent: Nov. 7, 2006

(54) WORKPIECE INSPECTION METHOD

(75) Inventor: Geoffrey McFarland, Dursley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/535,207

(22) PCT Filed: Dec. 5, 2003

(86) PCT No.: PCT/GB03/05326

§ 371 (c)(1),
(2), (4) Date: May 17, 2005

(87) PCT Pub. No.: WO2004/051179

PCT Pub. Date: Jun. 17, 2004

(65) Prior Publication Data
US 2006/0053646 A1    Mar. 16, 2006

(30) Foreign Application Priority Data
Dec. 5, 2002    (GB) ................... 0228371.1

(51) Int. Cl.
G06F 19/00    (2006.01)
G01B 21/00    (2006.01)
(52) U.S. Cl. .................. 33/503; 33/558; 702/95
(58) Field of Classification Search ............ 33/503; 702/95
See application file for complete search history.

(56) References Cited

U.S. PATENT DOCUMENTS

| 4,991,304 | A | | 2/1991 | McMurtry | |
| 5,209,131 | A | * | 5/1993 | Baxter | 33/559 |
| 5,251,156 | A | * | 10/1993 | Heier et al. | 33/503 |
| 5,315,259 | A | | 5/1994 | Jostlein | |
| 6,434,846 | B1 | * | 8/2002 | McMurtry et al. | 33/503 |
| 6,701,268 | B1 | * | 3/2004 | Noda et al. | 702/95 |
| 2005/0005465 | A1 | * | 1/2005 | Taylor et al. | 33/502 |
| 2005/0151963 | A1 | * | 7/2005 | Pulla et al. | 33/503 |

FOREIGN PATENT DOCUMENTS

| DE | 197 30 471 A1 | 2/1999 |
| DE | 100 50 795 A1 | 7/2001 |

OTHER PUBLICATIONS

Motavalli et al., "Automatic Generation of Dimensionally Accurate Three-Dimensional CAD Models for Reverse Engineering," Engineering Design & Automation, 4(2), pp. 85-100, 1998.

* cited by examiner

Primary Examiner—Christopher W. Fulton
(74) Attorney, Agent, or Firm—Oliff & Berridge, PLC

(57) ABSTRACT

A method of inspecting an artefact using a non contact measurement mounted on a coordinate measuring apparatus. An artefact is measured first with a contact probe (28) and then with a non contact probe (32). An error map or function is generated (34) which corresponds to the difference between the measurements taken with the contact and non-contact probes. This error map or function may be used to calibrate the probe. Alternatively subsequent artefact may be measured with the non contact probe (36) and the error map or function used to correct the measurements (38).

24 Claims, 5 Drawing Sheets

WORKPIECE INSPECTION METHOD

This invention relates to a method of inspecting the dimensions of workpieces using coordinate measuring apparatus. Coordinate measuring apparatus includes, for example, coordinate measuring machines (CMM), machine tools, manual coordinate measuring arms and inspection robots. In particular, the invention relates to a method of inspecting the dimensions of a workpiece using a non-contact probe.

It is common practice after workpieces have been produced, to inspect them on a coordinate measuring machine (CMM) having a quill onto which a probe is mounted which can be driven in three orthogonal directions X,Y,Z within a working volume of the machine.

Workpiece measuring probes may be divided into contact probes and non-contact probes. Contact probes comprise a housing with a workpiece-contacting stylus deflectable with respect to the housing. There are two main types of contact probe. In a touch trigger probe, the stylus is deflected from a rest position to cause a signal which indicates that the stylus has touched the surface of the workpiece. Alternatively a contact probe may comprise a scanning probe in which the deflection of the stylus is continuously measured as the stylus is moved along the surface of the workpiece.

Non-contact probes are positioned close to the surface of the workpiece without touching. The probe detects the proximity of the surface using, for example, capacitance, inductance or optical means.

Both contact and non-contact probes suffer from the disadvantage that scanning at a high speed causes dynamic errors in the system due to inertia.

Inaccuracies caused by the dynamic deflection of the probe may be reduced by causing the probe to travel very slowly.

Our previous U.S. Pat. No. 4,991,304 discloses a method of inspecting a series of workpieces using a coordinate measuring machine (CMM) in which a contact probe is first calibrated or datumed for each intended direction of probing movement by touching it at a slow speed against a reference object such as a datum ball to provide a set of correction offsets which are stored in the computer and used for subsequent measurement.

The first workpiece to be measured is put on the CMM table and a set of points on the surface of the workpiece are measured at a slow speed to allow accurate readings to be taken. Measurement of the first workpiece is then repeated at a fast speed. The difference between the slow speed readings and the fast speed readings is calculated and stored. The stored error value for each measured point takes into account the dynamic deflections of the machine structure at the fast speed.

The next workpiece to be measured is set up on the CMM table and readings are taken at the fast speed. At this speed the readings are inaccurate but repeatable. Each fast reading is adjusted by adding the corresponding stored error value and thus compensating for errors induced by fast reading.

This method has the advantage that a whole series of nominally identical workpieces can be measured at fast speed by making a dynamic error map from only one workpiece.

However, a disadvantage of this method is that fast contact scanning of a workpiece causes significant wear of the stylus tip of the probe.

Non-contact probes have the advantage that as there is no contact between the probe and workpiece, there is no wear of the probe.

Another advantage of non-contact probes is that there are no errors due to measurement force. In contact probes this is the force exerted by the probe on the workpiece and causes measurement errors due to bending of the stylus, coordinate positioning apparatus and deformable parts of the workpiece.

A further advantage is that non-contact probes have a higher surface sensing bandwidth that contact probes and thus provide more responsive measurement when scanning or measuring a workpiece at higher speed.

However use of a non-contact probe also has several disadvantages. The probe may have radial errors due to the manufacturing process which results in variations of the measurement data for measurements taken at different angles around the probe. This could be corrected for by an elaborate calibration.

In addition non-contact probes, such as inductance and capacitance probes, are influenced by the geometry of the part being measured and measurement data may vary, for example, between a straight and curved surface at the same distance from the probe. The surface finish of the part may also affect the measurement data from a non-contact probe, particularly for optical probes.

The present invention provides a method of inspecting an artefact using a coordinate measuring apparatus in which an artefact-sensing probe is moved into a position-sensing relationship with each artefact and a position reading taken, the method comprising the following steps in any suitable order:

measuring said artefact with an artefact-sensing probe in contact mode;

scanning said artefact with an artefact-sensing probe in non-contact mode;

generating an error map or function corresponding to the difference between the measurements taken with the artefact measuring probe in contact mode and the artefact measuring probe in non-contact mode; and using the error map or function to correct subsequent measurements with the artefact-sensing probe in non-contact mode.

The step of measuring said artefact with an artefact-sensing probe in contact mode may comprise scanning said artefact.

The artefact may be scanned with the artefact-sensing probe in non-contact mode with the artefact-sensing probe at a nominal offset from the artefact.

The error map or function may be used to calibrate the artefact-sensing probe in non-contact mode to thereby produce a radial correction for a nominal distance and direction of the artefact-sensing probe relative to the artefact surface.

The method may also comprise the steps of: measuring subsequent artefacts with the artefact-sensing probe in non-artefact mode and correcting the artefacts using the error map or function.

The subsequent artefact may comprise a workpiece. The initial artefact may comprise a workpiece substantially the same as the subsequent artefact. The initial artefact may be different from the subsequent artefact.

The same artefact-measuring probe may have both contact and non-contact modes, or these may be provided by two different probes.

The error map enables the non-contact scan to be corrected for measurement errors, and thus the probe does not need an elaborate calibration.

If the first artefact is substantially identical to the subsequent artefacts, then the error map or function also corrects for measurement errors of the non-contact probe caused by the geometric influence of the artefact.

In a subsequent embodiment of the invention, the artefact is measured the first time at a slow speed and the artefact is measured the second time at the speed of measurement of subsequent artefacts. Preferably the speed of measurement of subsequent artefacts is a fast speed.

This method reduces wear on the contact stylus tip and compensates for both dynamic speed errors and measurement errors of the non-contact probe at the same time.

The artefact may be measured the first time with a contact probe on a high accuracy reference machine, for example a CMM in a calibration laboratory. The artefact may then be measured the second time with the non-contact probe on a repeatable in-line (e.g. shop floor) coordinate measuring apparatus. A machine tool, when used for measuring an artefact with a probe would comprise a coordinate measuring apparatus. The error map or function generated may be used to correct the measurements of subsequent artefacts measured using the non-contact probe and in-line coordinate positioning machine. The error map or function may therefore accommodate one or more of the following errors: non-contact probe measurement errors, measurement errors due to the surface geometry of the artefact, geometric errors of the in-line machine and dynamic errors of the in-line system.

The artefact-measuring probe in non-contact mode may comprise for example an optical probe, a capacitance probe or an inductance probe. Generally these sensors are one-dimensional or scalar sensors and thus it is an advantage to use them in predefined path measurement mode. However this is not a requirement as the probes can also be used in unknown path mode.

Preferably the measurements of the workpiece from the contact probe are used to calculate a path for the non-contact probe to follow, especially if the surface of the artefact is non-prismatic/geometric.

A second aspect of the present invention provides apparatus for inspecting an artefact using a coordinate measuring apparatus and at least one artefact sensing probe, the apparatus comprising a controller adapted to perform the following steps in any suitable order:
  (a) measuring said artefact a first time with an artefact-sensing probe in contact mode;
  (b) measuring said artefact a second time with an artefact-sensing probe in non-contact mode;
  (c) generating an error map or function corresponding to the difference between the measurements taken with the artefact measuring probe in contact mode and the artefact measuring probe in non-contact mode;
  (d) measuring subsequent artefacts with the artefact measuring probe in non-contact mode; and
  (e) correcting the measurements of subsequent artefacts using the error map.

Preferred embodiments of the invention will now be described by way of example, with reference to the accompanying drawings wherein.

Figure 1:
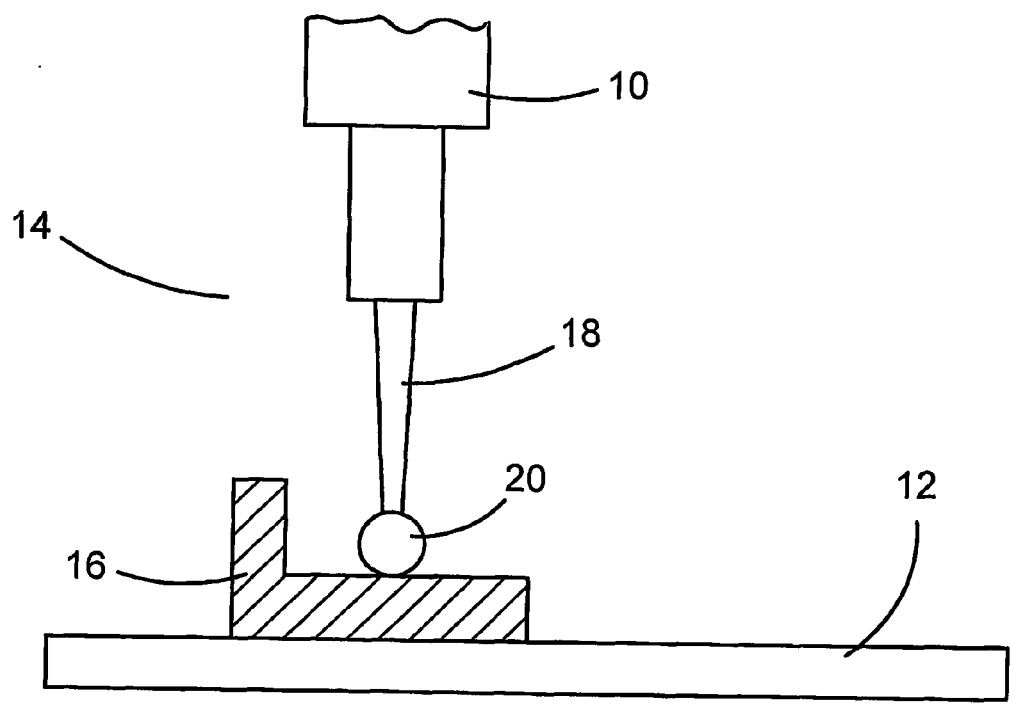
FIG. 1 is a schematic diagram of a contact probe mounted on a coordinate measuring machine.

The coordinate measuring machine shown in FIG. 1 comprises a machine table 12 on which a workpiece 16 may be placed. Preferably this is done by automatic means (not shown) which places each of a succession of substantially nominally identical workpieces from a production run in at least nominally the same position and orientation on the table. An analogue probe 14 having a deflectable stylus 18 and workpiece-contacting tip 20 is mounted on a quill 10 of the machine although other types of contact probes (including touch trigger probes) may also be used. The quill 10 and probe 14 may move in X,Y and Z directions under the action of X,Y and Z drives controlled by a computer. X,Y and Z scales (which include counters for the outputs of the scales) show the instantaneous coordinates of the position of the quill on which the probe is mounted in three dimensions. Signals from the probe indicating the deflection of the probe stylus are combined with the readings from the X,Y and Z scales of the CMM to calculate the position of the stylus tip and thus the surface of the workpiece. Alternatively, with a touch trigger probe a signal indicating that the probe has contacted the surface of the workpiece freezes the scales and the computer takes a reading of the coordinate of the workpiece surface.

As thus far described, the machine is conventional. The computer contains a programme which causes the probe to scan the surface of the workpiece or for a touch trigger probe to contact the surface of the workpiece at a plurality of different points sufficient to take all the required dimensions of the workpiece for the inspection operation required.

The analogue and touch trigger probes described both comprise contact probes in which the stylus 18 of the probe 14 is deflected on contact with the workpiece.

Figure 2:
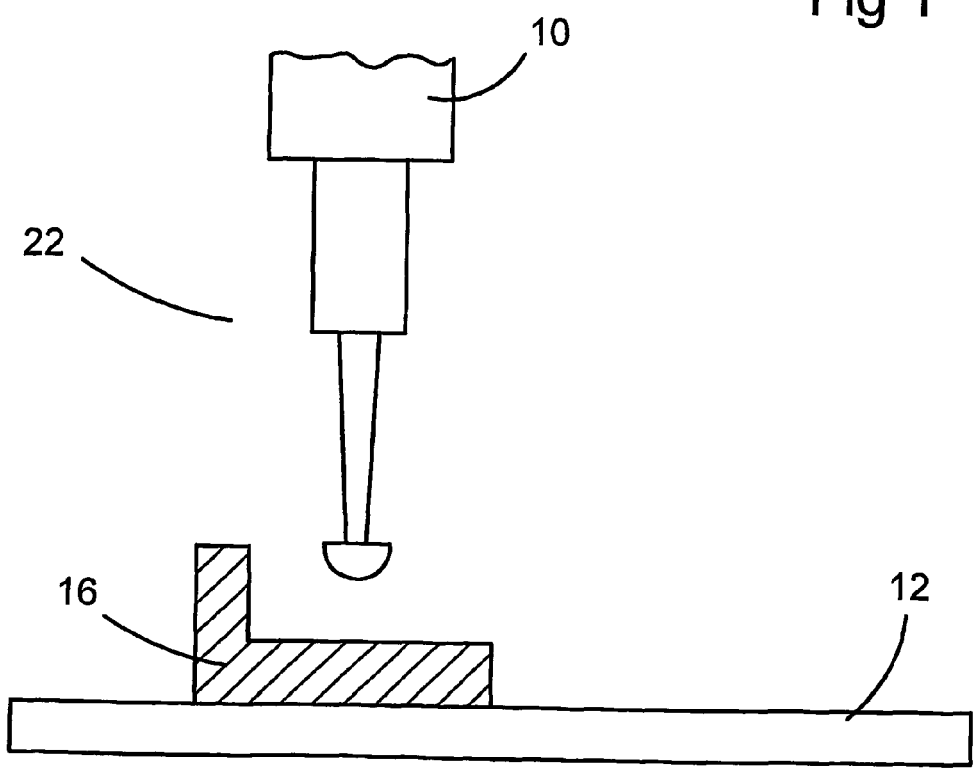
FIG. 2 is a schematic diagram of a non-contact probe mounted on a coordinate measuring machine.

FIG. 2 shows a non-contact probe 22 mounted on the quill 10 of a coordinate measuring machine, the non-contact probe 22 may comprise, for example, an optical probe, capacitance probe or inductance probe. As the quill 10 moves the probe 22 in a path around the workpiece 16, the probe detects the distance between itself and the surface of the workpiece. Signals from the probe are combined with the readings from the X,Y and Z scales of the CMM to calculate the position of the surface of the workpiece.

Figure 5:
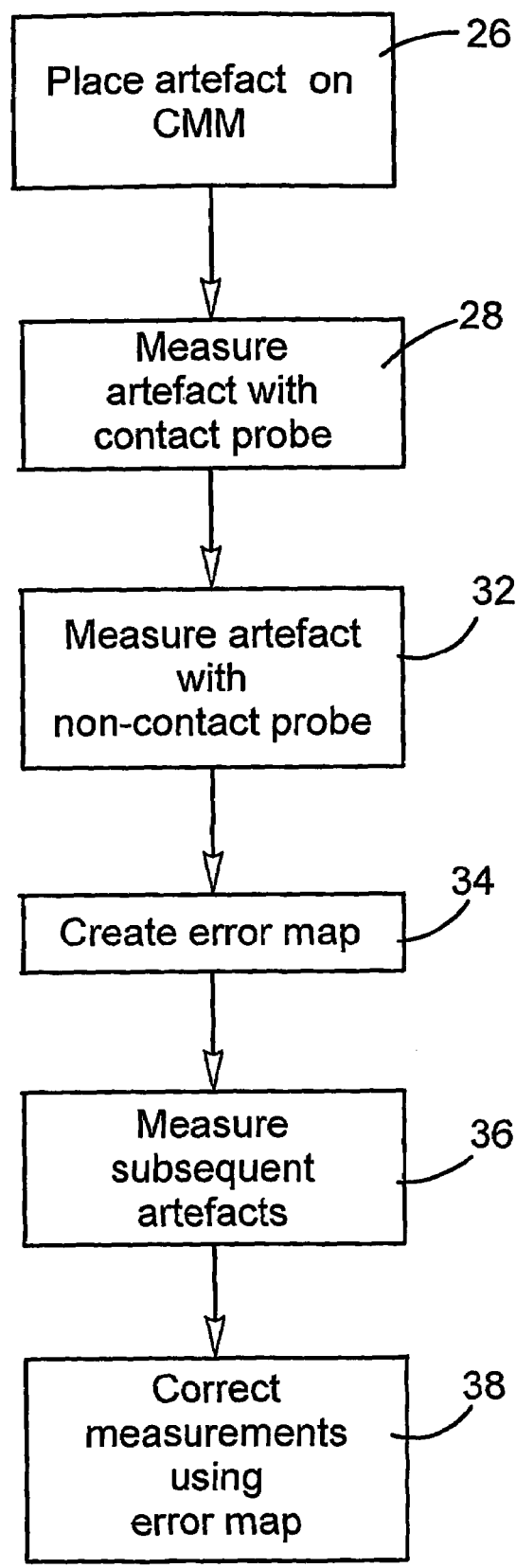
FIG. 5 is a flow chart illustrating the scanning method.

Referring to FIG. 5, the following procedure is used in the present inspection method. An artefact, such as a calibration artefact or a workpiece, is set up on a coordinate positioning machine 26, for example a CMM, and scanned or measured with a contact probe 28, for example an analogue probe. This contact probe is calibrated for static errors by conventional means, for example as described in U.S. Pat. No. 4,991,304 in which a set of correction offsets is calculated by touching the probe at a slow speed against a reference object, such as a datum ball, in a plurality of directions. These correction offsets are then used to correct all subsequent measurements.

The contact probe is exchanged for a non-contact probe, for example an inductance probe. The workpiece is then scanned or measured using the non-contact probe 32.

An error map or function is generated 34 from the difference between the results from the contact scan and the non-contact scan.

Subsequent artefacts are now placed on the CMM and scanned or measured using the non-contact probe 36.

Measurement data corresponding to the subsequent artefacts taken with the non-contact error map may thus be corrected using this error map or function 38. This method enables the use of an uncalibrated non-contact probe to be corrected for measurement errors.

Certain features of a workpiece, such as different surfaces and corners, may have an effect on the measurements from a non-contact scan, particularly with inductance and capacitance probes. An advantage of the present method is that errors due to these effects which may occur during the non-contact scan are corrected by the error map or function as the measurement data from the contact scan is not effected by these geometric influences. Thus measurements taken using the non-contact probe of subsequent workpieces having the same geometric features will also be corrected for these geometric influences.

The workpiece may be scanned using a probe which operates in both contact and non-contact modes. A single probe may be a combined touch trigger, contact scanning and non-contact probe. For example a combined touch trigger and non-contact probe may follow a path around the workpiece taking touch trigger points and then move around the path a second time taking non-contact measurements. Alternatively a combined touch trigger and non-contact probe may be brought into contact with a surface of the workpiece to obtain a trigger point and then reversed away from the surface to enable a non-contact measurement to be taken. This method allows the non-contact probe to be calibrated.

Figure 6:
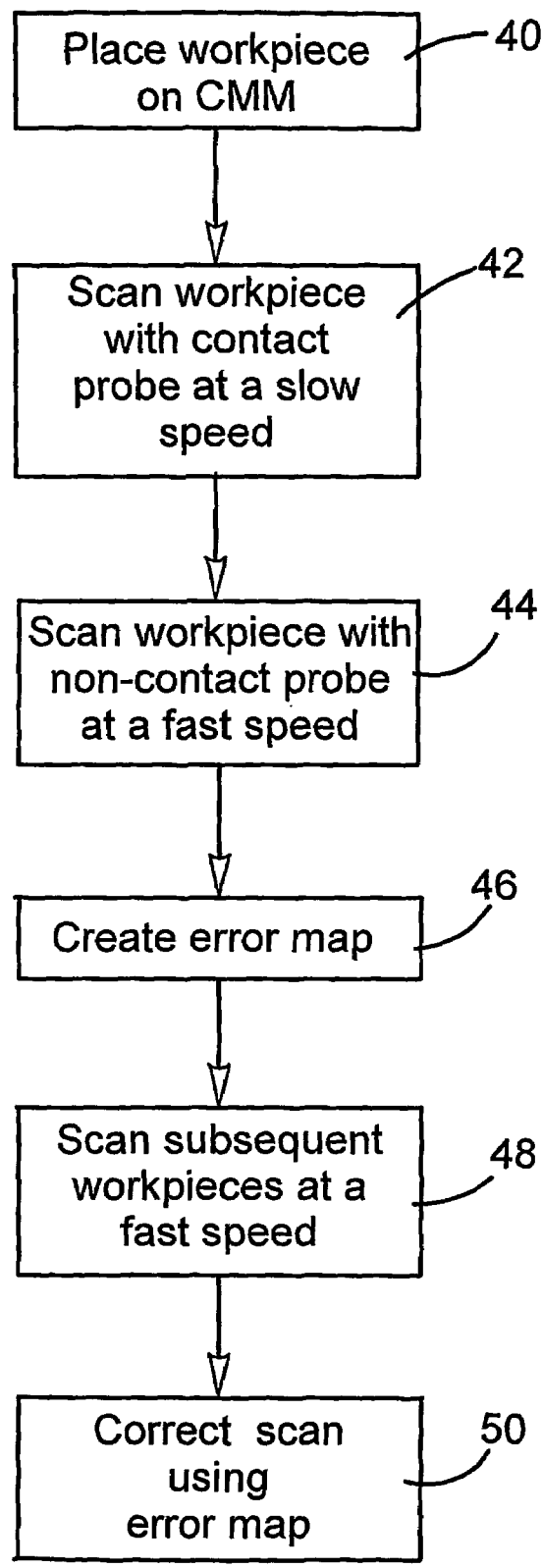
FIG. 6 is a flow chart illustrating a scanning method according to the second embodiment of the invention.

A second embodiment of the invention will now be described with reference to FIG. 6. In this embodiment, a workpiece having an unknown surface, from a series of workpieces to be measured is set up on the CMM 40 and scanned or measured at a slow speed with the contact probe 42. At this slow speed, the dynamic errors of the system are negligible. For example, typically the speed may be <20 mm/s.

The workpiece is then scanned using the non-contact probe 44. This scan is carried out at a speed at which the subsequent workpieces will also be scanned. This is a fast speed to facilitate high speed inspection. The fast speed is preferably greater than 20 mm/s, for example it may typically be 100 mm/s.

As before, an error map or function is generated 46 corresponding to the difference between the results from the slow speed contact scan and the fast speed non-contact scan.

Subsequent workpieces in the series of workpieces are set up on the CMM and scanned by the CMM using the non-contact probe 48. The data relating to the subsequent workpieces is corrected by the error map 50. The subsequent parts are measured at substantially the same speed as before, i.e. the fast speed of the non-contact probe.

Figure 3:
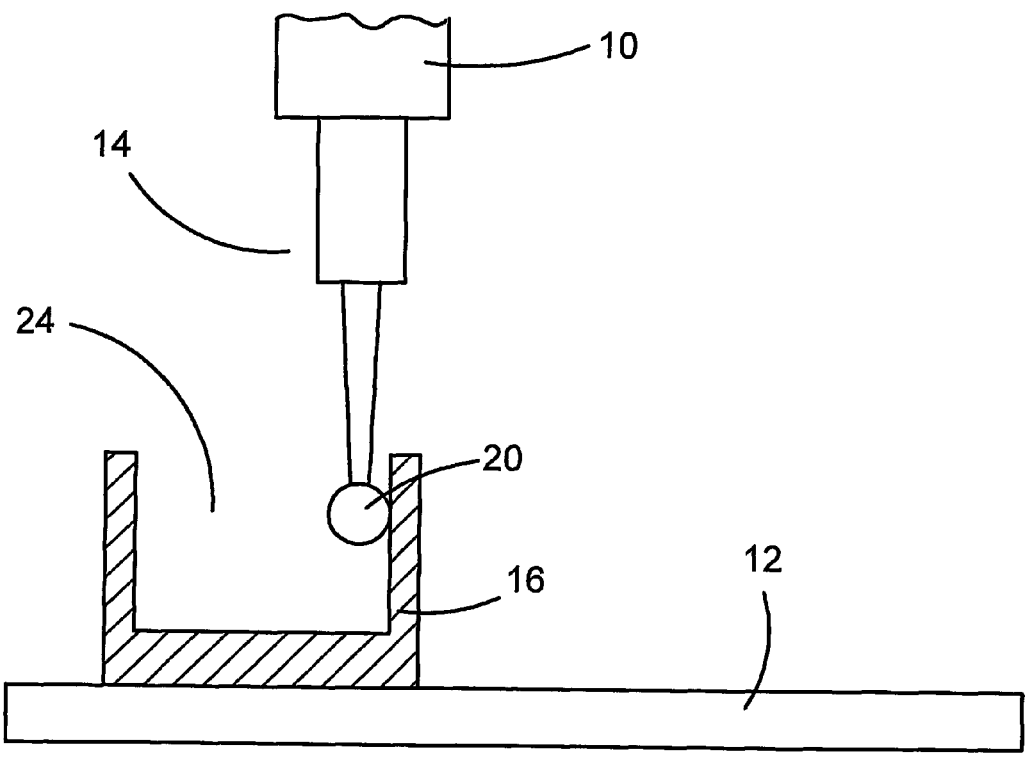
FIG. 3 is a schematic diagram showing a contact probe scanning a bore of a workpiece.
Figure 4:
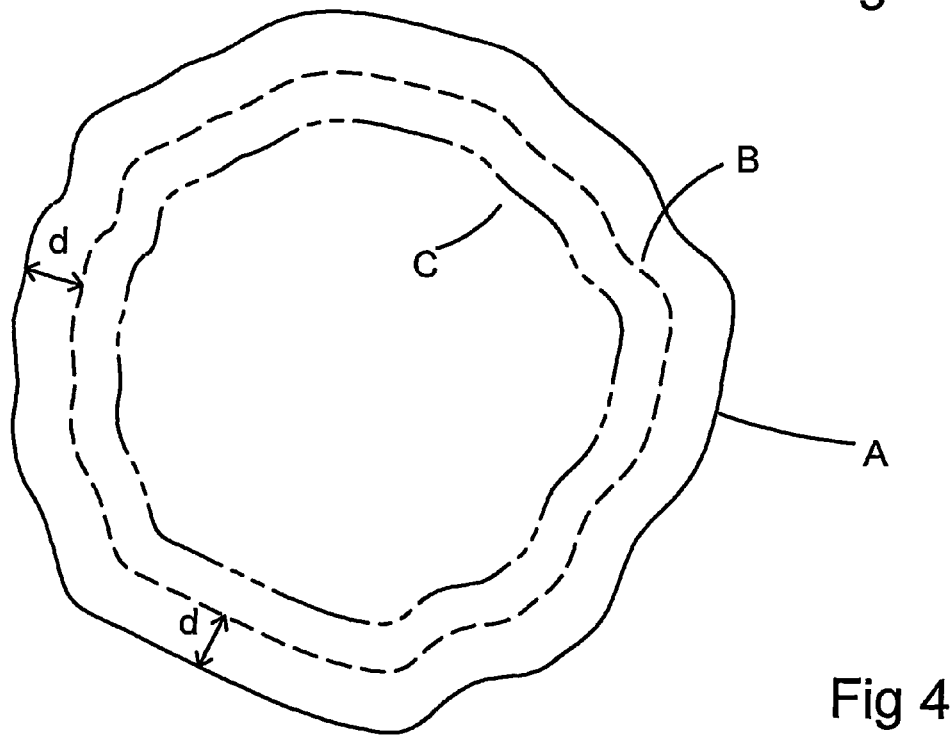
FIG. 4 illustrates the paths of the contact probe and non-contact probe when scanning the bore of FIG. 3.

FIG. 3 illustrates a bore 24 of a workpiece 16 being scanned with a contact probe 14. The path of the workpiece-contacting probe 14 when scanning the bore 24 is shown as A in FIG. 4. This profile accurately depicts the surface of bore 24 as the contact probe is calibrated to eliminate static errors and the bore is scanned slowly to reduce dynamic errors.

The data collected from the contact scan may be used to calculate a path C along which the non-contact probe travels to scan the bore 24. This path C is offset from profile A.

The surface of the bore 24 as measured by the non-contact scan is shown by profile B. This profile B may less accurately depict the surface of the bore 24 than profile A as the non-contact probe has not been calibrated for either static or dynamic errors or radial errors due to manufacture and geometric features of the surface. The differences d between profiles A and B are used to calculate error values by which subsequent non-contact scans are corrected.

This method thus has the advantage that both dynamic and static errors of the non-contact measurement method are compensated for. Dynamic speed errors are compensated for by the initial slow scan with the contact probe and static errors are compensated for by the initial slow scan being carried out with a calibrated probe.

Non-contact probes are usually one-dimensional and it is thus preferable to calculate the path of the non-contact scan to follow. The measurements taken by the contact probe may be used to calculate the path for the non-contact probe to follow. For example this path may be offset from the measured surface of the artefact a certain distance X.

It may not be necessary to use data collected from the contact scan to calculate the path of the non-contact scan. For example, if the workpiece has nominally predefined features, the non-contact scan can be easily ascertained from these features. Furthermore, if a multi-dimensional non-contact sensor is used, the workpiece may be easily measured using unknown path techniques.

The invention is not limited to the coordinate measuring apparatus providing movement of the probe relative to the artefact along three orthogonal axes. For example, the coordinate measuring apparatus may comprise a rotary table on which the artefact is placed which allows the artefact to be rotated relative to a probe.

Figure 7:
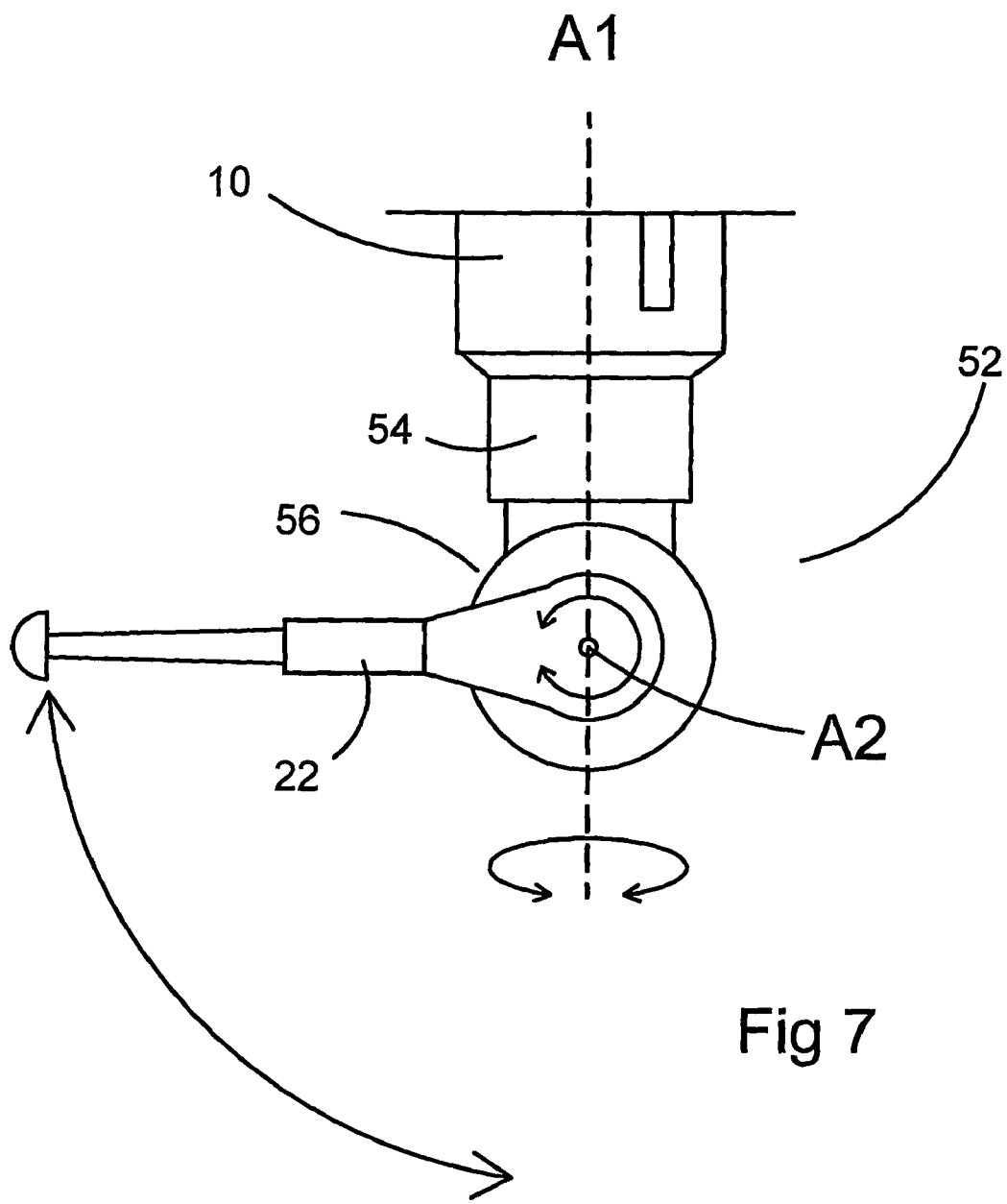
FIG. 7 illustrates a non-contact probe mounted on an articulating head.

Alternatively, or additionally, the probe may be mounted on an articulating head which may have one or more rotational degrees of freedom. FIG. 7 illustrates a non-contact probe 22, for example an inductance probe, mounted on an articulating head 52 which is in turn mounted on a spindle 10 of a coordinate measuring machine. The articulating head 52 comprises a fixed housing 54 which is mounted to the machine spindle 10. A second housing 56 is rotatable with respect to the first housing 54 about an axis A1. The non-contact probe 22 is mounted rotatably to the second housing 56 and is rotatable about a second axis A2, orthogonal to the A1 axis. The artefact may be measured by the probe mounted on such an articulating head by rotation of the probe by the head or a combination of rotation and translation of the head by the coordinate measuring apparatus.

The invention claimed is:

1. A method of inspecting an artefact using a coordinate measuring apparatus in which an artefact-sensing probe is moved into a position-sensing relationship with each artefact and a position reading taken, the method comprising the following steps in any suitable order:
    measuring a surface of an artefact with an artefact-sensing probe in contact mode;
    measuring said surface of the artefact with an artefact-sensing probe in non-contact mode;
    generating an error map or function corresponding to the difference between the measurement taken with the artefact-sensing probe in contact mode and the artefact-sensing probe in non-contact mode; and
    using the error map or function to correct subsequent measurements with the artefact-sensing probe in non-contact mode.

2. A method according to claim 1 wherein the step of measuring said surface of the artefact with an artefact-sensing probe in contact mode comprises scanning said artefact.

3. A method according to claim 1 wherein said surface of the artefact is measured with the artefact-sensing probe in non-contact mode with the artefact-sensing probe at a nominal offset from said surface of the artefact.

4. A method according to claim 1 wherein the error map or function is used to calibrate the artefact sensing probe in non-contact mode to thereby produce a radial correction for a nominal distance and direction of the artefact sensing probe relative to said surface of the artefact surface.

5. A method according to claim 1, comprising the additional steps of:
measuring subsequent artefacts with the artefact measuring probe in non-contact mode; and
correcting the measurements of subsequent artefacts using the error map or function.

6. A method according to claim 1 wherein the artefact-sensing probe in contact mode and the artefact-sensing probe in non-contact mode comprise a single artefact-measuring probe with both contact and non-contact modes.

7. A method according to claim 1 wherein the artefact-sensing probe in contact mode and the artefact-sensing probe in non-contact mode comprise separate probes.

8. A method according to claim 1 wherein said surface of the artefact is measured with the artefact-sensing mode in contact mode at a slow speed and with the artefact-sensing mode in non-contact mode at the desired speed of measurement of subsequent artefacts.

9. A method according to claim 8 wherein the speed of measurement of subsequent artefacts is a fast speed.

10. A method according to claim 1 wherein said surface of the artefact is measured with the artefact-sensing probe in contact mode using a high accuracy reference co-ordinate measuring apparatus and said surface of the artefact is measured with the artefact-sensing probe in non-contact mode using a repeatable co-ordinate measuring apparatus.

11. A method according to claim 1 wherein the measurements of said surface of the artefact gained from measurement with the artefact-sensing probe in contact mode are used to calculate a path for the artefact-sensing probe in non-contact mode to follow.

12. A method according to claim 1 wherein the path for the artefact sensing probe in non-contact mode is ascertained using predefined features of the artefact.

13. A method according to claim 1 wherein the step of measuring a surface of said artefact with the artefact sensing probe in non-contact mode comprises scanning said surface of the artefact.

14. Apparatus for inspecting an artefact using a coordinate measuring apparatus and at least one artefact sensing probe, the apparatus comprising a controller adapted to perform the following steps in any suitable order:
(a) measuring a surface of an artefact with an artefact-sensing probe in contact mode;
(b) measuring said surface of an artefact with an artefact-sensing probe in non-contact mode;
(c) generating an error map or function corresponding to the difference between the measurements taken with the artefact measuring probe in contact mode and the artefact measuring probe in non-contact mode;
(d) measuring subsequent artefacts with the artefact measuring probe in non-contact mode; and
(e) correcting the measurement of subsequent artefact using the error map or function.

15. Apparatus for inspecting an artefact using a coordinate measuring apparatus and at least one artefact sensing probe, the apparatus comprising a controller adapted to perform the following steps in any suitable order:
measuring the surface of an artefact with an artefact-sensing probe in contact mode;
measuring said surface of the artefact with an artefact-sensing probe in non-contact mode;
generating an error map or function corresponding to the difference between the measurement taken with the artefact-sensing probe in contact mode and the artefact-sensing probe in non-contact mode; and
using the error map or function to correct subsequent measurements with the artefact-sensing probe in non-contact mode.

16. Apparatus according to claim 15 wherein the step of measuring said artefact with an artefact-sensing probe in contact mode comprises scanning said artefact.

17. Apparatus according to claim 15 wherein said surface of the artefact is measured with the artefact-sensing probe in non-contact mode with the artefact-sensing probe at a nominal offset from said surface of the artefact.

18. Apparatus according to claim 15 wherein the error map or function is used to calibrate the artefact sensing probe in non-contact mode to thereby produce a radial correction for a nominal distance and direction of the artefact sensing probe relative to the artefact surface.

19. Apparatus according to claim 15, comprising the additional steps of:
measuring subsequent artefacts with the artefact measuring probe in non-contact mode; and
correcting the measurements of subsequent artefacts using the error map or function.

20. Apparatus according to claim 15 wherein said surface of the artefact is measured with the artefact-sensing mode in contact mode at a slow speed and with the artefact-sensing mode in non-contact mode at the speed of measurement of subsequent artefacts.

21. Apparatus according to claim 20 wherein the speed of measurement of subsequent artefacts is a fast speed.

22. Apparatus according to claim 15 wherein the measurements of the surface of the artefact gained from measurement with the artefact-sensing probe in contact mode are used to calculate a path for the artefact-sensing probe in non-contact mode to follow.

23. Apparatus according to claim 15 wherein the path for the artefact sensing probe in non-contact mode is ascertained using predefined features of the artefact.

24. Apparatus according to claim 15 wherein the step of measuring said artefact sensing probe in non-contact mode comprises scanning said surface of the artefact.

* * * * *